United States Patent
Fujikawa et al.

(10) Patent No.: US 8,349,425 B2
(45) Date of Patent: Jan. 8, 2013

(54) THIN BIAXIALLY STRETCHED THIN-WALLED POLYESTER BOTTLE

(75) Inventors: Takuya Fujikawa, Yokohama (JP); Kouji Maeda, Yokohama (JP); Hiroshi Hayashi, Hiki-gun (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 559 days.

(21) Appl. No.: 12/444,979

(22) PCT Filed: Oct. 10, 2007

(86) PCT No.: PCT/JP2007/070210
§ 371 (c)(1),
(2), (4) Date: Apr. 27, 2009

(87) PCT Pub. No.: WO2008/044793
PCT Pub. Date: Apr. 17, 2008

(65) Prior Publication Data
US 2009/0304969 A1   Dec. 10, 2009

(30) Foreign Application Priority Data
Oct. 12, 2006   (JP) .................................. 2006-278649

(51) Int. Cl.
*B29D 22/00* (2006.01)
(52) U.S. Cl. ..................................... 428/36.92; 264/532
(58) Field of Classification Search ............... 428/36.92, 428/36.9; 264/516, 532
See application file for complete search history.

(56) References Cited

U.S. PATENT DOCUMENTS

| | | | |
|---|---|---|---|
| 4,128,383 A | 12/1978 | Bond et al. | |
| 4,476,170 A * | 10/1984 | Jabarin | 428/36.92 |
| 4,927,679 A * | 5/1990 | Beck | 428/36.92 |
| 2005/0140036 A1 | 6/2005 | Hirota et al. | |

FOREIGN PATENT DOCUMENTS

| | | |
|---|---|---|
| EP | 1974891 A1 | 10/2008 |
| JP | 52-033956 A | 3/1977 |
| JP | 05-024099 A | 2/1993 |
| JP | 05-185494 A | 7/1993 |
| JP | 07-257534 A | 10/1995 |
| JP | 2001-122237 A | 5/2001 |
| JP | 2003-191319 A | 7/2003 |
| JP | 2004-075151 A | 3/2004 |
| WO | 2007083396 A1 | 7/2007 |

* cited by examiner

*Primary Examiner* — Rena Dye
*Assistant Examiner* — Susan R Dye
(74) *Attorney, Agent, or Firm* — Sughrue Mion, PLLC

(57) ABSTRACT

A biaxially stretched polyester bottle of which a central part of a bottle body portion satisfies at least either (1) that an elongation in the circumferential direction is larger than an elongation in the longitudinal direction in the tensile test at room temperature or (2) that an orientation parameter in the circumferential direction is smaller than an orientation parameter in the longitudinal direction in the Raman spectrometry. Despite the body portion having an average thickness as small as 250 μm or less, the bottle has a drop impact resistance while exhibiting excellent appearance.

1 Claim, 4 Drawing Sheets

① EXAMPLE 1    LONGITUDINAL DIRECTION
② EXAMPLE 1    CIRCUMFERENTIAL DIRECTION
③ COMPARATIVE EXAMPLE 1    THIN, LONGITUDIAL DIRECTION
④ COMPARATIVE EXAMPLE 1    THIN, CIRCUMFERENTIAL DIRECTION
⑤ COMPARATIVE EXAMPLE 2    NORMALLY THICK, LONGITUDIAL DIRECTION
⑥ COMPARATIVE EXAMPLE 2    NORMALLY THICK, CIRCUMFERENTIAL DIRECTION

THIN BIAXIALLY STRETCHED THIN-WALLED POLYESTER BOTTLE

TECHNICAL FIELD

This invention relates to a biaxially stretched polyester bottle of which the bottle body portion is highly decreased in thickness. More specifically, the invention relates to a thin biaxially stretched polyester bottle having excellent drop impact resistance and appearance.

BACKGROUND ART

There has heretofore been known a biaxially stretched polyester bottle obtained by biaxially stretch-blow-molding a preform of a polyester resin such as polyethylene terephthalate. Owing to its excellent transparency, surface luster, impact resistance and gas-barrier property, the biaxially stretched polyester bottle has been widely used as a container for containing various kinds of beverages, foods, liquid detergents, etc.

The biaxially stretched polyester bottle used for containing beverages, usually, has an average thickness of about 0.25 to about 0.30 mm. From the standpoint of decreasing the cost and weight, however, it has been desired to further decrease the amount of the resin that is used.

From the above point of view, therefore, JP-A-7-257534 is proposing a bottle-like container obtained by blow-molding in a manner that the body portion has an average thickness of not larger than 0.25 mm and that the average stretching ratio is not smaller than 10 times.

The weight of the bottle-like container can be decreased when it has a capacity as large as, for example, 5000 mL. However, it becomes difficult to decrease the weight when the container has a capacity which is relatively as small as 2000 mL or less. In producing the bottle-like container, further, attempts have been made to increase the average stretching ratio to be not smaller than 10 times in the biaxial stretch-blow-molding while the longitudinal stretching ratio is in an ordinary range of 2 to 2.7 times. If it is attempted to further increase the longitudinal stretching ratio, problems arise such as whitening due to over-stretching, peeling of lamination (delamination) and burst, making the forming difficult.

There has further been proposed a thin bottle attempting to decrease the weight by decreasing the thickness of some portions of the container. For example, JP-A-2001-122237 is disclosing a technology dealing with a bottle of about 500 ml setting an average thickness of the shoulder portion to be 0.2 to 0.3 mm, an average thickness of the body portion to be 0.02 to 0.05 mm, and forming transverse ribs on the body portion to increase the strength against deformation. When the bottle having a thickness that so greatly varies as above is to be stretch-blow-molded, however, it becomes necessary to form a preform having a varying thickness by injection-molding accompanied by a problem in that it becomes difficult to set the conditions for stretch-blow-molding the preform.

The applicant has further proposed in JP-A-2003-191319 a biaxially stretch-blow-molded bottle of polyester having an average thickness that was decreased to 0.1 to 0.2 mm. This biaxially stretch-blow-molded bottle is free from whitening that stems from the over-stretching; i.e., a self-standing thin bottle-like container is formed making it possible to decrease the amount of the resin that is used and to decrease the weight.

DISCLOSURE OF THE INVENTION

However, the bottle that is biaxially stretch-blow-molded by the above production method is accompanied by such problems as often undergoing the burst in the initial state of blow-molding or permitting a portion where the temperature has dropped to remain as a ring-like thick portion if the burst does not occur, and exhibiting poor appearance and inferior drop impact resistance.

It is, therefore, an object of the present invention to provide a thin biaxially stretched polyester bottle of which the body portion is decreased in thickness to be not larger than 250 μm and, preferably, not larger than 200 μm in average thickness, exhibiting excellent appearance as well as drop impact resistance.

According to the present invention, there is provided a biaxially stretched polyester bottle obtained by biaxially stretch-blow-molding a preform of a polyester resin, wherein a central part of a bottle body portion satisfies at least either (1) that an elongation in the circumferential direction is larger than an elongation in the longitudinal direction in the tensile test at room temperature or (2) that an orientation parameter in the circumferential direction is smaller than an orientation parameter in the longitudinal direction in the Raman spectrometry.

In the biaxially stretched polyester bottle of the present invention, it is desired that:

1. The bottle body portion has an average thickness of not larger than 250 μm;
2. The elongation factor in the circumferential direction is not smaller than 100% and, particularly, in a range of 100 to 1000%;
3. The orientation parameter in the circumferential direction is not larger than 3.5 and, particularly, in a range of 1.5 to 3.5; and
4. In a method of producing a biaxially stretched polyester bottle by stretching a polyester preform heated at a stretching temperature by using a stretch rod, further, followed by stretching by blowing the air, the air is blown into the preform at such a flow rate that the preform does not come in contact with the stretch rod but an end thereof and does not come in contact with the surface of a metal mold at the time of effecting the stretching by using the stretch rod.

In the biaxially stretched polyester bottle of the invention, even if the bottle body portion has an average thickness of not larger than 250 μm, there is formed no ring-like thick portion that occurred in the conventional thin biaxially stretched polyester bottles, and excellent appearance and drop impact resistance are obtained.

Further, since the thickness is very small, the amount of the resin that is used can be decreased, and the weight can be decreased.

In this specification, the "thin" biaxially stretched polyester bottle stands for a polyester bottle of which the bottle body portion has an average thickness in a range which is not larger than about 250 μm. Here, the average thickness (t) of the bottle body portion stands for a value (t=V/S) obtained by finding a volume (V) of the bottle under the neck thereof from the weight (G) of the bottle under the neck, i.e., of a portion under the neck ring (portion excluding the neck ring and the threaded portion for fastening the cap) and the specific gravity (γ) of the resin that is used, calculating the surface area (S) of the bottle under the neck, i.e., of a portion under the neck ring, and dividing the volume (V) of the bottle under the neck by the surface area of the bottle under the neck.

In forming the thin biaxially stretched polyester bottle of which the bottle body portion has an average thickness of less than 250 μm as described above, the bottle often bursts while it is being formed. Even if the container is formed without bursting, it exhibits inferior appearance and drop impact resistance.

From the above viewpoint, the present applicant has proposed a method of forming a thin biaxially stretched polyester bottle having a bottle body portion of an average thickness of not larger than 200 μm by stretching polyester preform heated at a stretching temperature by using a stretch rod, further, followed by stretching by blowing the air, the air being blown into the preform at such a flow rate that the preform does not come in contact with the stretch rod but an end thereof and does not come in contact with the surface of a metal mold at the time of effecting the stretching by using the stretch rod (WO2007/83396).

The applicant has discovered that the biaxially stretched polyester bottle of the invention obtained by the above production method exhibits an elongation at the central part of the body portion in the circumferential direction which is larger than the elongation thereof in the longitudinal direction in the tensile test at room temperature and exhibits an orientation parameter at the central part of the body portion in the circumferential direction which is smaller than the orientation parameter thereof in the longitudinal direction in the Raman spectrometry, which are properties that are not found from the thin biaxially stretched polyester bottle having a bottle body portion of an average thickness of not larger than 200 μm obtained by the method of JP-A-2003-191319 filed by the present applicant (hereinafter, this bottle is called "conventional thin bottle") or from the conventional normally thick biaxially stretched polyester bottle having the bottle body portion of an average thickness of not smaller than 250 μm (hereinafter, this bottle is called "normally thick bottle"), and have discovered the fact that the thin biaxially stretched polyester bottle satisfying the above properties exhibits excellent appearance and markedly improved drop impact resistance as compared to those of the conventional thin bottles.

FIG. 1 illustrates a relationship between the elongation and the stress of when the test pieces of a size of 5×40 mm cut from the body portions of the biaxially stretched polyester bottle of the invention (Example 1), conventional thin bottle (Comparative Example 1) and normally thick bottle (Comparative Example 2) were subjected to the tensile test under the conditions of a distance between chucks of 5 mm and a tensile speed of 10 mm/min.

As will be obvious from the results of FIG. 1, the conventional thin bottle exhibits elongation which is not so large in either the longitudinal direction or the circumferential direction, and has a little difference between the elongation in the longitudinal direction and the elongation in the circumferential direction. The normally thick bottle exhibits a common tendency in that the elongation in the longitudinal direction is larger than the elongation in the transverse direction.

On the other hand, the thin biaxially stretched polyester bottle of the present invention exhibits a very large elongation in the circumferential direction as compared to the bottles of Comparative Examples 1 and 2 and the elongation in the circumferential direction which is very larger than the elongation in the longitudinal direction, which are the features that are not found in other bottles.

FIG. 2 illustrates the orientations by the Raman spectrometry of the biaxially stretched polyester bottle of the invention (Example 1), conventional thin bottle (Comparative Example 1) and normally thick bottle (Comparative Example 2) produced by Example and Comparative Examples that will be described later under the measuring conditions of using a laser beam of a wavelength of 532 nm, over a measuring range of 1800 to 600 $cm^{-1}$, a measuring time of 5 seconds and two times of integration.

It will be obvious from FIG. 2 that the conventional thin bottle (FIG. 2(B)) exhibits an orientation which is larger in the circumferential direction than in the longitudinal direction and the normally thick bottle (FIG. 2(C)), too, exhibits an orientation which is larger in the circumferential direction than in the longitudinal direction.

On the other hand, the thin biaxially stretched polyester bottle of the present invention (FIG. 2(A)) exhibits an orientation which is larger in the longitudinal direction than in the circumferential direction at any position in the direction of thickness, which is a feature that is not found in other bottles.

As compared to the conventional thin bottle and the normally thick bottle, the biaxially stretched polyester bottle of the invention having the above feature makes it possible to decrease the amount of the resin that is used and to decrease the weight of the bottle while exhibiting such properties as excellent appearance and drop impact resistance as will become obvious from the results of Examples described later.

That is, the conventional thin bottle has the bottle body portion of an average thickness of not larger than 200 μm using the resin in a decreased amount and contributing to decreasing the weight but forming a thick ring portion that deteriorates the appearance and exhibiting a drop impact resistance or an allowable height of drop of 90 cm, which is inferior to that of the biaxially stretched polyester bottle of the present invention (Comparative Example 1). The normally thick bottle is satisfactory from the standpoint of drop impact resistance but has the body portion of an average thickness of as large or larger than 0.25 mm but not larger than 0.30 mm making it difficult to decrease the amount of the resin that is used or to decrease the weight (Comparative Example 2).

On the other hand, the biaxially stretched polyester bottle of the present invention has the bottle body portion of an average thickness of not larger than 250 μm and, particularly, not larger than 200 μm making it possible to decrease the amount of the resin that is used and to decrease the weight yet having a uniform thickness and exhibiting excellent appearance. Its excellent drop impact strength, i.e., allowable height of drop of 120 cm is also obvious (Example 1).

BEST MODE FOR CARRYING OUT THE INVENTION (Biaxially Stretched Polyester Bottles)

Figure 3:
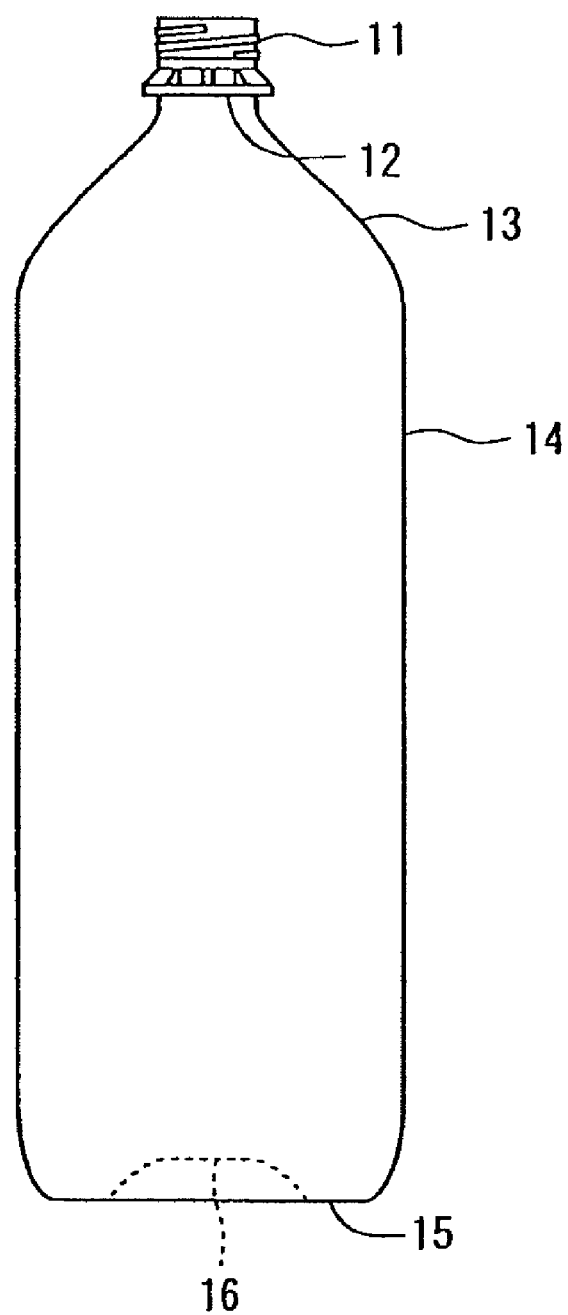
FIG. 3 is a side view of a biaxially stretched polyester bottle of the present invention.

FIG. 3 is a side view illustrating a biaxially stretched polyester bottle of the present invention, wherein a polyester bottle comprises an unstretched mouth portion 11 and a support ring 12, a stretched shoulder portion 13, a body portion 14 and a bottom portion 15, and is formed in a shape that can be erected by itself due to a recessed portion 16 formed in the bottom portion 15.

The polyester bottle is designed to decrease its weight and to decrease the amount of the resin that is used. The stretched shoulder portion 13, body portion 14 and bottom portion 15 desirably have an average thickness in a range of 0.05 to 0.25 mm, more desirably, 0.07 to 0.20 mm and, particularly desirably, 0.07 to 0.15 mm. Therefore, the amount of change in the thickness is not larger than 0.1 mm and, desirably, not larger than 0.05 mm making it possible to greatly decrease the weight.

The biaxially stretched polyester bottle of the present invention does not require any particular reinforcing portions such as reinforcing beads for reinforcing the rigidity and strength to compensate for a decrease in the weight and in the thickness, but may have a recessed reinforcing rib annularly formed on the inside at the center of the body portion.

(Polyester Resins)

The polyester resin constituting the biaxially stretched polyester bottle of the invention may be a known polyester resin that has heretofore been used for the biaxial stretch-blow-molding.

As the dicarboxylic acid component constituting the polyester resin, it is desired that not less than 50% and, particularly, 80% of the dicarboxylic acid component is a terephthalic acid from the standpoint of mechanical properties and thermal properties. Here, however, a carboxylic acid component other than the terephthalic acid may be contained, as a matter of course. As the carboxylic acid component other than the terephthalic acid, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid and sebacic acid.

As the diol component, on the other hand, it is desired that not less than 50% and, particularly, not less than 80% of the diol component is an ethylene glycol from the standpoint of mechanical properties and thermal properties. As the diol component other than the ethylene glycol, there can be exemplified 1,4-butanediol, propylene glycol, neopentyl glycol, 1,6-hexylene glycol, diethylene glycol, triethylene glycol, cyclohexanedimethanol, ethylene oxide adduct of bisphenol A, glycerol and trimethylolpropane.

There may be further included trifunctional or more highly functional polybasic acids and polyhydric alcohols, such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid, as well as pentaerythritol, glycerol, trimethylolpropane, 1,2,6-hexanetriol, sorbitol, 1,1,4,4-tetrakis(hydroxymethyl)cyclohexane, etc.

Further, the polyester resin may be blended with known blending agents for resins, such as coloring agent, antioxidant, stabilizer, various antistatic agents, parting agent, lubricant and nucleating agent according to known recipe in a range without impairing the quality of the finally formed article.

(Forming Methods)

The preform used for forming the biaxially stretched polyester bottle of the invention is obtained by, for example, injection-molding or compression-molding the above polyester resin according to a known method, and the preform that is obtained is, as required, thermally crystallized at the mouth portion thereof by heating.

The preform used in the invention may be of a single-layer structure of the above polyester resin, or may be of a multi-layer structure using the above polyester resin as inner and outer layers, and using, as an intermediate layer, other thermoplastic resin or a known functional resin composition having such functions as gas-barrier property, oxygen-absorbing property and oxygen-absorbing gas-barrier property.

The formed preform is heated at a stretching temperature before being subjected to the stretch-blow-molding. Here, it is desired that the preform is so heated that the temperature on the outer surface of the preform is in a range of 100 to 130° C. and, particularly, 115 to 125° C., and the temperature difference between the outer surface and the inner surface of the preform is not larger than 2° C. If the temperature on the outer surface of the preform is higher than 130° C., the preform is thermally crystallized and is whitened, which is not desirable. Upon uniformly heating the preform in the direction of thickness so that the temperature difference between the inner surface and the outer surface of the preform is not larger than 2° C., the thermal stress generated at the time of stretching can be nearly uniformalized on the inner and outer surfaces, and the preform can be uniformly stretched without unevenness effectively preventing the whitening caused by excess of stretching or burst caused by abnormal shrinking. As a result, a biaxially stretched polyester bottle having a further decreased thickness can be formed maintaining a good yield.

Next, an embodiment of the stretch-blow-molding will be briefly described with reference to the diagrams of steps shown in FIG. 4.

Referring to FIG. 4(A), a preform 20 that is uniformly heated at a high temperature under the above heating conditions is fixed at its mouth portion, and is put into a blowing metal mold 21. In this state as shown in FIG. 4(B), the air is blown into the preform at such a flow rate that the preform does not come in contact with a stretch rod but an end thereof and does not come in contact with the surface of the metal mold, and the preform 20 is stretched in the axial (longitudinal) direction by using the stretch rod 22.

Figure 4:
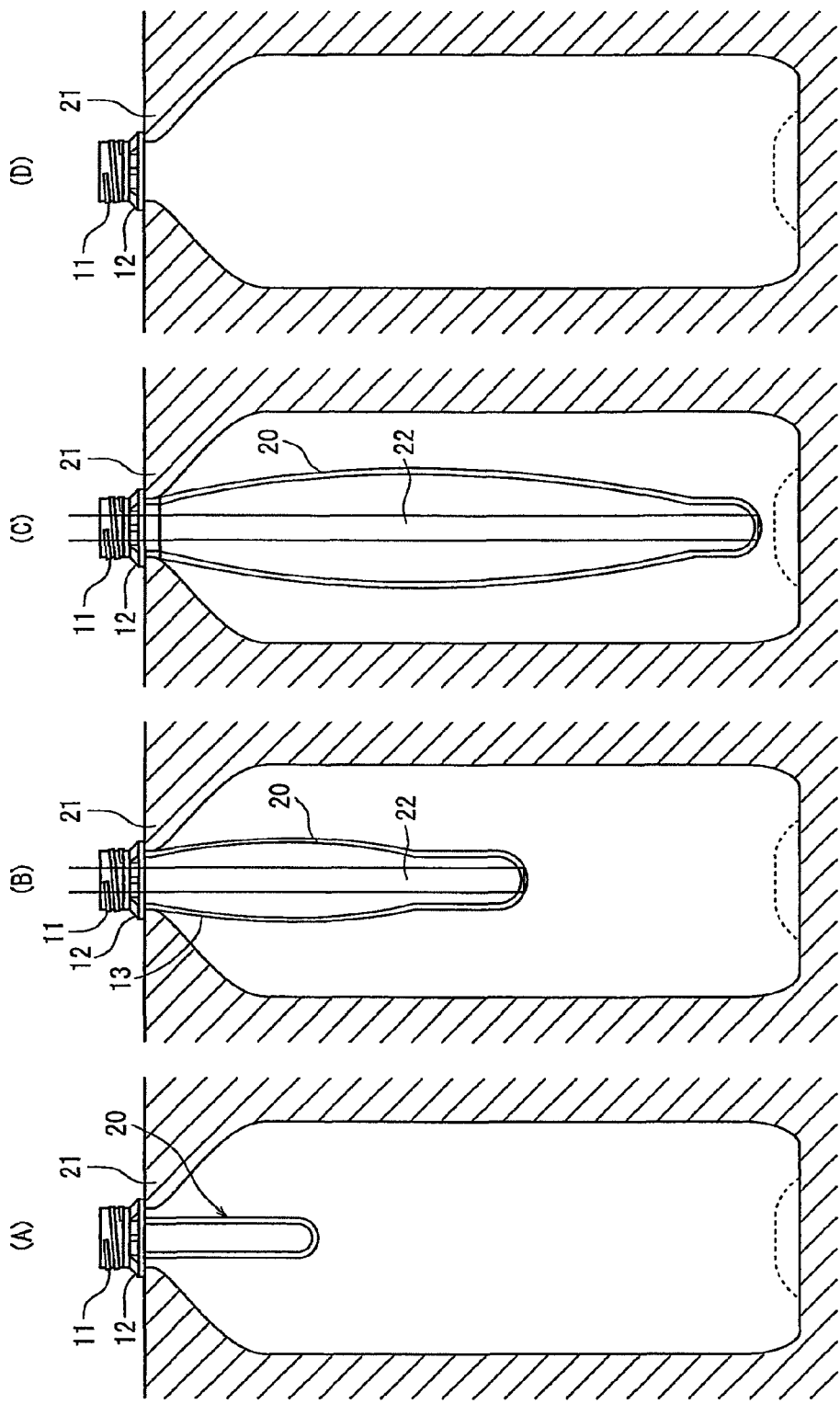
FIG. 4 is a diagram illustrating the steps of forming the biaxially stretched polyester bottle of the present invention.

In the embodiment shown in FIG. 4, the stretch rod 22 executes the stretching nearly up to about 95% of the distance of from under the neck of a finally formed article to the grounding surface (FIG. 4(C)). At this moment, however, the preform that is being formed is not still coming in contact with the surface of the metal mold.

At a moment the stretching by using the stretch rod is finished according to the embodiment of the invention, the blow-molding is continued without varying the rate of blowing the air until the finally formed article is obtained, whereby the stretching is effected substantially in the circumferential direction, the preform comes in contact with the surface of the metal mold and is shaped into the finally formed article (FIG. 4(D)).

According to another embodiment of the method of forming the biaxially stretched polyester bottle of the invention, at a moment when the stretching by the stretch rod is finished, a main blow is effected at a flow rate larger than the above flow rate whereby the stretching is effected substantially in the circumferential direction, and the preform comes in contact with the surface of the metal mold and is shaped into the finally formed article (FIG. 4(D)).

The bottle after blow-molded is heat-set, and is cooled to obtain the finally formed article. The heat-set can be conducted by a one-mold method in a blow-molding metal mold or by a two-mold method in a metal mold for heat-set which is separate from the blow-molding metal mold. The heat-set is usually conducted at a temperature in a range of 60 to 180° C.

Through the stretching by the stretch rod 22, a portion corresponding to the shoulder portion 13 of the finally formed article is stretched and, next, a portion corresponding to an upper part of the body portion 14 is stretched and, thereafter, most of the portions of the preform 20 corresponding to lower portions of the body portion 14 of the polyester bottle and the bottom portion 15 are stretched. At the time of effecting the stretching by using the stretch rod as described above, further, the air is blown at a predetermined flow rate making it possible to prevent the preform from coming in contact with the stretch rod irrespective of the diameter of the stretch rod.

The flow rate which maintains the preform from coming in contact with the stretch rod except the end thereof and from coming in contact with the surface of the metal mold, may vary depending upon the size of the preform, diameter of the stretch rod and the shape of the finally formed article, and cannot be exclusively specified. However, the air can be blown with its pressure being adjusted to be from 0.05 to 0.5 MPa. In the case of a 2000-mL biaxially stretched polyester bottle having a final shape with its transverse cross section being circular as shown in FIG. 4, it is desired that the pressure of the air that is blown is in a range of 0.05 to 0.1 MPa. By decreasing the rate of blowing the air as described above, it is made possible to suppress a change in the temperature caused by the adiabatic expansion of the air blown into the preform from the air tank and to conduct the stretch-blow-molding at a temperature as set in the air tank.

It is, further, desired that the air that is blown has been adjusted for its temperature in the air tank to lie in a range of 60 to 300° C. and, particularly, 100 to 200° C. By adjusting the temperature of the blown air to be high as described above, a drop in the temperature of the preform can be suppressed and, therefore, a uniform stretching can be accomplished making it possible to suppress the orientation of the biaxially stretched polyester bottle in the circumferential direction and to highly decrease the thickness.

The biaxially stretched polyester bottle of the invention can be formed even by effecting the stretch-blowing by blowing the air into the preform at such a flow rate that the preform does not come in contact with the stretch rod except the end thereof and does not come in contact with the surface of the metal mold until the end of the stretch-blow-molding without developing burst. From the standpoint of improving the productivity by shortening the time required for the stretching, however, it is particularly desired to blow the air as pre-blow at the time of effecting the stretching by using the stretch rod, finish the pre-blow simultaneously with the end of stretching by the stretch rod and, thereafter, effect the stretching by the main blow.

In this case, it is desired that the pre-blow effected at the time of stretching by the stretch rod is to blow the air in an amount of 10 to 50% and, particularly, 25 to 40% of the volume of the biaxially stretched polyester bottle which is the finally formed article.

It is, further, desired that the stretch rod stretches the preform in the longitudinal direction to a distance of not less than 70% of the distance of from under the neck down to the grounding surface in the final size of the bottle (vertical distance from the support ring 12 down to the grounding surface in FIG. 3). If the distance is less than 70%, the amount of stretch due to blowing the air becomes too great. When the stretching is effected by being divided into the one due to the pre-blow and the one due to the main blow, in particular, a sharp stretching due to the main blow may cause over-stretching, defective shaping and burst.

The upper limit of stretch in the longitudinal direction by the stretch rod is a distance which is smaller than the distance of from under the neck down to the grounding surface in the final size of the bottle, from which is subtracted the thickness of the center of the bottom portion or, when a recessed portion is provided in the center of the bottom portion, from which is subtracted the depth of the recessed portion. In the case of a 2000-mL polyester bottle, in general, the upper limit of stretch is about 95% of the distance from under the neck down to the grounding surface in the final size of the bottle.

In effecting the stretching by the stretch rod, it is desired that a maximum speed of the stretch rod is not larger than 700 mm/sec. and, particularly, in a range of 200 to 500 mm/sec., and that the speed of the end of the stretch rod of when it comes in contact with the inner surface of the bottom portion of the preform is not larger than 200 mm/sec. or comes into a halt temporarily.

By using the stretch rod as described above, the stretching is mildly and uniformly effected without unevenness suppressing the formed biaxially stretched polyester bottle from being stretched or oriented in the longitudinal direction, permitting the biaxially stretched polyester bottle to exhibit the above-mentioned properties, and effectively preventing over-stretching, defective shaping or burst that results from sharp stretching.

After the end of the stretching by the stretch rod, it is desired that the main blow is adjusted to a pressure of 0.5 to 4.0 MPa, and the air adjusted to a temperature of 60 to 300° C. is blown; i.e., the air is blown being adjusted to be of the same temperature as the air that is pre-blown and being adjusted to have a pressure higher than that of the air that is pre-blown offering advantage from the standpoint of productivity requiring only one air tank for the stretch-blow-molding apparatus.

In the method of producing the biaxially stretched polyester bottle of the present invention, the stretching ratios are desirably such that the longitudinal stretching ratio is not smaller than 2.7 times and the area ratio is 12 to 25 times to obtain the biaxially stretched polyester bottle having a decreased thickness and a decreased weight.

EXAMPLES

Example 1

A preform of a polyester resin of a mass of 19 g was formed by using an injection-molding machine, heated up to 115° C., stretched by using a stretch rod at a speed of 200 mm/sec., while blowing the air, as a pre-blow, into the preform at such a flow rate (0.07 MPa) that the preform does not come in contact with the stretch rod but an end thereof and that the preform does not come in contact with the surface of the metal mold and, further, blowing the air of 2 MPa, as a main blow, to form a bottle of a volume of 2000 mL.

The obtained bottles (N=5 bottles) were found for their average thickness to be 90 μm at the body portion at a position 12 cm above the bottom portion.

Figure 1:
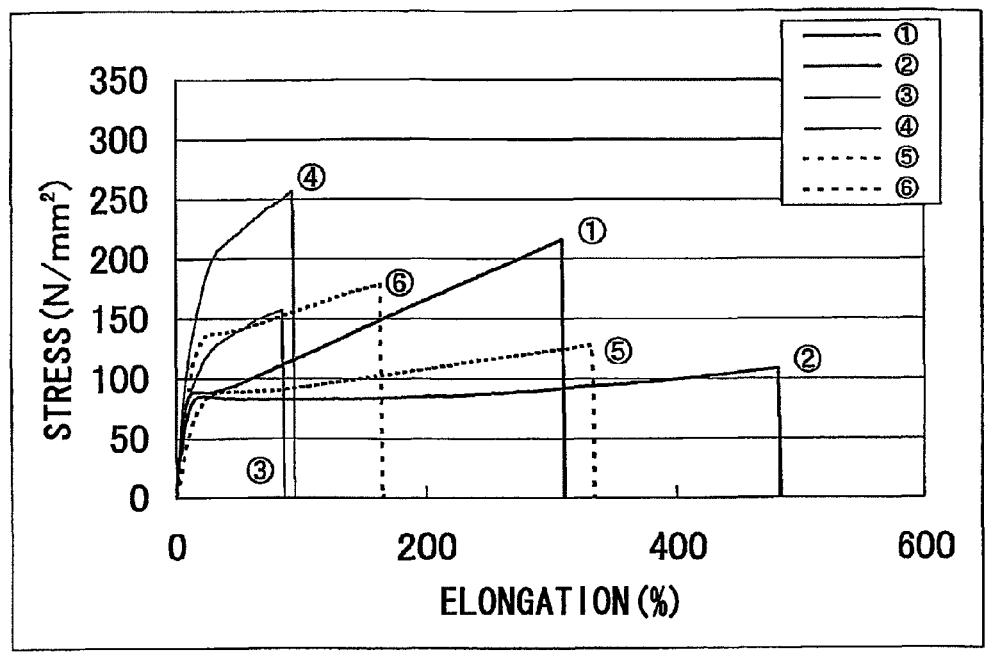
FIG. 1 is a diagram illustrating a relationship between the elongation and the stress of various kinds of biaxially stretched polyester bottles in the tensile test.

Further, test pieces of a size of 5×40 mm were cut out from the body portions at a position 12 cm above the bottom portions, and were subjected to the tensile test under the conditions of a distance between chucks of 5 mm and a tensile speed of 10 mm/min. The results were as shown in FIG. 1.

Figure 2:
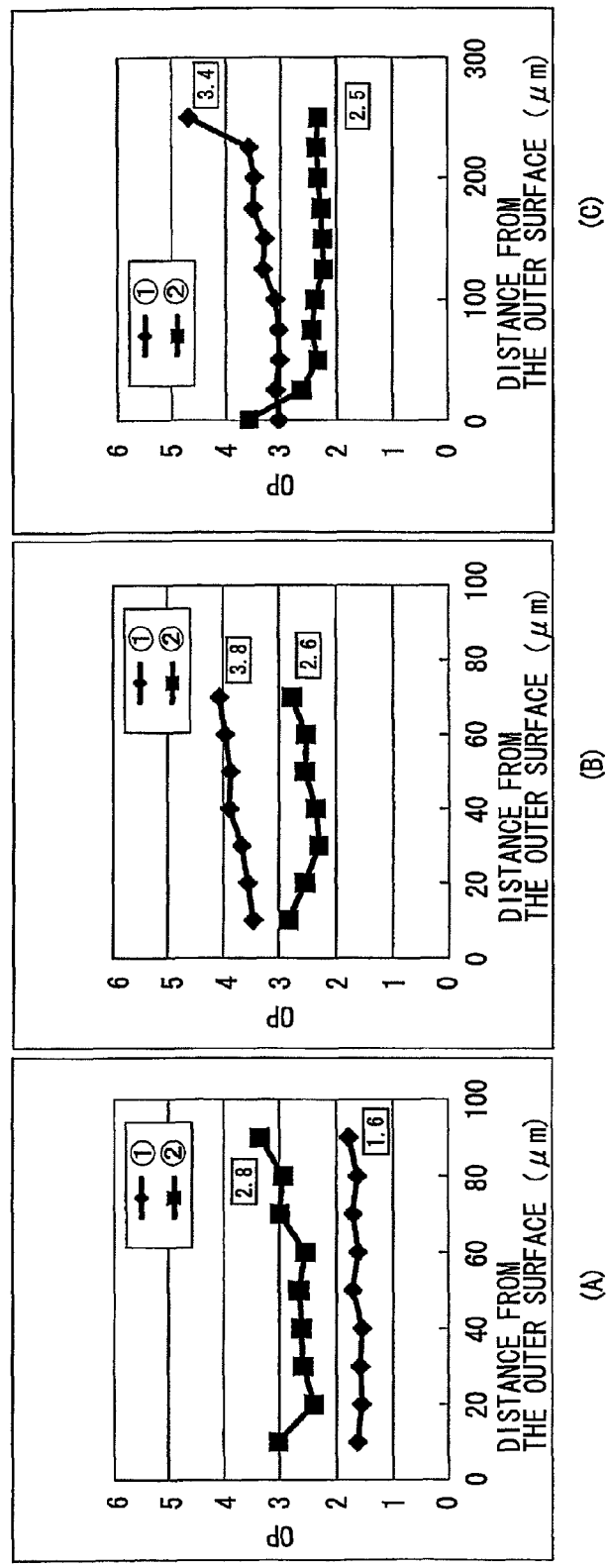
FIG. 2 is a diagram illustrating a relationship between the orientation and the distance from the outer surface of various kinds of biaxially stretched polyester bottles by the Raman spectrometry.

Further, samples were cut out from the body portions of the bottles at a position 12 cm above the bottom portions, and were measured for their orientation by the Raman spectrometry by using a laser beam of a wavelength of 532 nm over a measuring range of 1800 to 600 cm$^{-1}$ under the conditions of a measuring time of 5 seconds and 2 times of integration. FIG. 2(A) shows values of orientation parameters (OP) for the distances from the outer surface.

The obtained bottles were further evaluated for their drop impact resistances. The allowable height of drop was 120 cm.

The allowable height of drop was measured in a manner as described below.

The fully-filled bottles were dropped on a floor surface coated with a resin (1) in an erected manner so that the bottom portions fell, first, and (2) in a manner that the side surfaces fell, first, repetitively, 5 times in this order. A maximum height at which neither the body portion nor the bottom cracked was regarded to be an allowable height of drop.

Comparative Example 1

A preform of a polyester resin of a mass of 19 g was formed by using an injection-molding machine, heated up to 124° C., stretched by using a stretch rod at a speed of 200 mm/sec., while blowing the air of 0.8 MPa, as a pre-blow, into the preform and, further, blowing the air of 3 MPa, as a main blow, to form a bottle of a volume of 2000 mL.

The obtained bottles were measured for their average thickness at the body portions in the same manner as in Example 1 to be 80 µm.

The bottles were, further, subjected to the tensile test and measurement of orientation by the Raman spectrometry in the same manner as in Example 1 to obtain the results as shown in FIG. 1 and FIG. 2(B).

The bottles were further evaluated for their drop impact resistance in the same manner as in Example 1. The allowable height of drop was 90 cm.

Comparative Example 2

A preform of a polyester resin of a mass of 45 g was formed by using an injection-molding machine, heated up to 110° C., stretched by using a stretch rod at a speed of 800 mm/sec., while blowing the air of 0.8 MPa, as a pre-blow, into the preform and, further, blowing the air of 2 MPa, as a main blow, to form a bottle of a volume of 2000 mL.

The obtained bottles were measured for their average thickness at the body portions in the same manner as in Example 1 to be 260 µm.

The bottles were, further, subjected to the tensile test and measurement of orientation by the Raman spectrometry in the same manner as in Example 1 to obtain the results as shown in FIG. 1 and FIG. 2(C).

The bottles were further evaluated for their drop impact resistance in the same manner as in Example 1. The allowable height of drop was 120 cm.

The invention claimed is:

1. A biaxially stretched polyester bottle having a bottle body portion obtained by biaxially stretch-blow-molding a preform of a polyester resin, wherein the bottle body portion has an average thickness of not larger than 250 µm, a central part of the bottle body portion elongates more in the circumferential direction than in the longitudinal direction in a tensile test at room temperature, and has an elongation factor in the circumferential direction of not smaller than 100%, wherein said biaxially stretched polyester bottle is produced by a method of stretching a polyester preform heated at a stretching temperature by using a stretch rod, further, followed by stretching by blowing the air, wherein the air is blown into the preform at such a flow rate that the preform does not come in contact with the stretch rod but an end thereof and does not come in contact with the surface of a metal mold at the time of effecting the stretching by using said stretch rod.

* * * * *